(12) United States Patent
Rivera et al.

(10) Patent No.: US 10,264,803 B2
(45) Date of Patent: Apr. 23, 2019

(54) CHEESE PRODUCTS WITH ENHANCED MELT AND METHODS

(75) Inventors: Edwin Gerardo Rivera, Chicago, IL (US); Rodrigo R. Roesch, Green Bay, WI (US)

(73) Assignee: KRAFT FOODS GROUP BRANDS LLC, Northfield, IL (US)

(*) Notice: Subject to any disclaimer, the term of this patent is extended or adjusted under 35 U.S.C. 154(b) by 1213 days.

(21) Appl. No.: 13/221,193

(22) Filed: Aug. 30, 2011

(65) Prior Publication Data

US 2012/0052181 A1    Mar. 1, 2012

Related U.S. Application Data

(60) Provisional application No. 61/379,254, filed on Sep. 1, 2010.

(51) Int. Cl.
*A23C 19/082* (2006.01)

(52) U.S. Cl.
CPC ...... *A23C 19/082* (2013.01); *A23C 2250/054* (2013.01); *A23V 2002/00* (2013.01)

(58) Field of Classification Search
USPC .......................................................... 426/582
See application file for complete search history.

(56) References Cited

U.S. PATENT DOCUMENTS

| | | | |
|---|---|---|---|
| 4,277,503 A * | 7/1981 | Bily ............... | A23C 19/054 426/40 |
| 4,552,774 A * | 11/1985 | Gronfor ............... | 426/582 |
| 4,885,183 A | 12/1989 | Strandholm et al. | |
| 5,009,913 A * | 4/1991 | Ahmed ............... | A23C 15/16 426/581 |
| 5,028,449 A * | 7/1991 | Hatanaka ............... | A23J 7/00 426/478 |
| 5,080,912 A * | 1/1992 | Bodenstein et al. ............ | 426/33 |

(Continued)

FOREIGN PATENT DOCUMENTS

| EP | 2027776 | * | 6/2008 |
|---|---|---|---|
| JP | 56058448 A | | 5/1981 |

(Continued)

OTHER PUBLICATIONS

USDA Food list File Retrieved Dec. 14, 2012 http://ndb.nal.usda.gov/ndb/foods/show/9.*

(Continued)

*Primary Examiner* — Katherine D Leblanc
(74) *Attorney, Agent, or Firm* — Fitch, Even, Tabin & Flannery, LLP (57) ABSTRACT

Cooked and homogenized cheese products and methods, using supplemental phospholipids to provide reduced melt restriction and modulate oiling-off. One embodiment provides a cooked cheese product having at least one natural cheese in the range of 20 to 92 percent weight; a protein supplement in the range of 0.25 to 30 percent weight; and a phospholipid supplement in the range of about 0.1 to 1 percent weight; wherein cooked cheese product is homogeneous does not contain significant levels of emulsifying salts. The phospholipid supplement can be in the range of about 0.25 to 1 percent weight, and preferably 0.4 percent weight. Homogenizing the cooked cheese product can be by a pressure in the range of about 70 to 246 Kg/cm.

11 Claims, 10 Drawing Sheets

(56) References Cited

U.S. PATENT DOCUMENTS

| | | | |
|---|---|---|---|
| 5,935,634 A * | 8/1999 | Gamay | A23C 19/082 |
| | | | 426/582 |
| 6,120,809 A | 9/2000 | Rhodes | |
| 7,309,510 B2 | 12/2007 | Sekula et al. | |
| 2006/0062885 A1 | 3/2006 | Jacobson et al. | |
| 2008/0299252 A1 | 12/2008 | Fatum et al. | |
| 2009/0092730 A1 | 4/2009 | Smith et al. | |

FOREIGN PATENT DOCUMENTS

| | | |
|---|---|---|
| JP | 56058449 A | 5/1981 |
| WO | WO 00/54601 | 9/2000 |

OTHER PUBLICATIONS

"Pasteurization" International Dairy Foods Association. Retrieved Oct. 25, 2017. http://www.idfa.org/news-views/media-kits/milk/pasteurization.*

The Role of Homogenization in the Manufacture of Halloumi and Mozzarella Cheese from Recombined Milk; J. of Society of Diary Tech., vol. 43, No. 1, Feb. 1990.

* cited by examiner

CHEESE PRODUCTS WITH ENHANCED MELT AND METHODS

RELATED APPLICATIONS

This application claims the benefit of U.S. Provisional Application Ser. No. 61/379,254, filed Sep. 1, 2010, which is incorporated herein by reference in its entirety.

FIELD

There are provided herein cheese products and methods, and specifically cooked and homogenized cheese products and methods, using supplemental phospholipids to provide reduced melt restriction and modulate oiling-off.

BACKGROUND

Processed cheese can be prepared by blending various cheeses and other dairy products with other components and processes. A finished processed cheese product can sometimes have different characteristics than found in a typical unprocessed cheese. Such characteristics can include differences in melt and fat separation over time, or at increased temperatures, as compared to unprocessed cheese. It is often desirable to adjust these characteristics of a resultant processed cheese to reflect product specifications and/or consumer expectations.

For example, "oiling-off" refers to separation of fat from a product (such as a cheese) in the form of a free oil. Oiling off can occur over time, or at increased product temperatures. In some instances oiling-off can be expected, such as cheeses exposed to high temperatures like those found in a pizza oven, which can be about 500 degrees F. (about 260 degrees C.). Oiling-off can also be associated with the overall stability of a cheese product over time.

Attempts are known in the art to control oiling-off, such as by an enzyme treatment. For example, U.S. Pub. 2008/0299252 to Fatum et al. describes improving fat stability in cheese by providing an enzyme treatment, such as a phospholipase C and/or D, to a "cheese milk", to deplete phospholipids in the cheese milk.

Melt characteristics are also an important aspect of a cheese product. A "melt value" can be described in a number of ways, such as the ratio of an area of a melted cheese to the area of the un-melted cheese when subjected to certain standardized heating conditions (See generally, U.S. Pat. No. 4,885,183 to Strandholm, et al.). In Strandholm et al., the term "melt value" can be the ratio of the area of the melted cheese to the area of the unmelted cheese, using a piece of cheese of a predetermined sample size (for example, about 6.4 mm thick and 42 mm diameter), which is placed in a covered petri dish for 5 minutes in an oven at a temperature which is suitable for the type of cheese, i.e. usually a temperature of from 350 degrees F. (about 177 degrees C.) to 450 degrees F. (about 232 degrees C.). A melt value of 1.0 indicates no melt of the cheese section occurs, whereas a melt value of 2.0 indicates that a doubling of area occurs during the melt test. The same type of melt test can be carried out in a microwave oven using the same sample size cheese placed in a petri dish and typically heating for 30 seconds on maximum power in a 700 watt oven. (See generally, Strandholm, et al., col. 5, beginning line 6). Other methods can include measuring the diameter or radius of a melt area under controlled conditions and compared among samples (see below).

One way to control melt characteristics of a processed cheese can be through homogenization at various defined pressures during its production. It is known that increased homogenization pressure increases melt restriction. In other words, cheese products that are exposed to homogenization during production typically melt less in proportion to increasing homogenization pressures. Nevertheless, as homogenization pressure increases, there can also be decreases in the cheese product's stretchability and oiling-off, as well as increases in cheese whiteness. Lecithin has been used in some instances to improve meltability of recombined cream that is homogenized before making a cheese product. In this instance, some unknown level of a phospholipids coating (lecithin) is added to an anhydrous milk fat (AMF) of an already homogenized natural cheese milk. (See generally, *The Role of Homogenization in the Manufacture of Halloumi and Mozzarella Cheese from Recombined Milk.* J. of the Society of Dairy Tech., Vol. 43, No. 1, February 1990)

Other considerations in the development of homogenized and cooked cheese products and methods are a product's desired organoleptics, firmness and protein and fat microstructure. The processes described above show significant advances in the art, but further advances are possible and desired.

SUMMARY

There are provided herein cheese products and methods, and specifically cooked and homogenized cheese products and methods, using supplemental phospholipids to provide reduced melt restriction and modulate oiling-off.

One embodiment provides a cooked cheese product having at least one natural cheese in the range of 20 to 92 percent weight; a protein supplement in the range of 0.25 to 30 percent weight; and a phospholipid supplement in the range of about 0.1 to 1 percent weight; wherein cooked cheese product is homogeneous does not contain significant levels of emulsifying salts. The phospholipid supplement can be in the range of about 0.25 to 1 percent weight, and preferably 0.4 percent weight.

The cooked cheese product can have at least one natural cheese contains having up to 70 percent weight of at least one of a mild or medium aged cheddar and up to 70 percent weight of a sharp cheddar. The protein supplement can be in the range of about 5 to 8 percent weight. Moisture content of the cheese product can be in the range of about 35 to 60 total percent weight, preferably about 40 to 46 total percent weight. Total fat content of the cooked cheese product can be in the range of about 20 to 29 total percent weight.

Optionally, the embodiments may provide a NaCl supplement in the range of about 1.8 to 1.98 total percent weight. Further optional components can include coloring, sorbic acid, anhydrous milk fat, whey protein, hydrocolloids (such as gums and gelatin), nutrients, and combinations thereof combined with the protein supplement for a total of 0.25 to 30 percent weight of the cooked cheese product.

The present embodiments also include methods to produce a phospholipid enriched cooked and homogenized cheese produce. Steps can include: blending at least one raw natural cheese and a fresh slurry comprising a phospholipid supplement and a protein supplement; cooking the blend at a temperature in the range of about 63 to 121 degrees C. for a period up to about 30 minutes to produce a cooked cheese product; homogenizing the cooked cheese product by a pressure in the range of about 70 to 246 Kg/cm; wherein the cooked and homogenized cheese product is about 20 to 92 percent weight of at least one natural cheese, about 0.25 to 30 percent weight protein supplement, and about 0.1 to 1 percent phospholipid and wherein the cooked and homogenized cheese product does not contain significant levels of emulsifying salts. Optionally, the cheese product can be pasteurized.

The method to produce a cooked cheese of the present embodiments can include the step of cooking the blend at a temperature in the range of about 68 to 72 degrees C. for a period of about 2 minutes.

Optionally, the method can also include the steps of providing NaCl in the range of about 1.8 to 1.98 percent weight; moisture in the range of about 40 to 50 percent weight; fat in the range of about 10 to 35 percent weight; and protein in the range of about 10 to 20 percent weight.

Other features will become more apparent to persons having ordinary skill in the art to which pertains from the following description and claims.

BRIEF DESCRIPTION OF THE FIGURES

The foregoing features, as well as other features, will become apparent with reference to the description and figures below, in which like numerals represent elements, and in which.

DETAILED DESCRIPTION

The embodiments described below provide cheese products and methods, and specifically cooked and homogenized cheese products and methods, using supplemental phospholipids to provide reduced melt restriction and modulate oiling-off. The compositions and methods provide organoleptics, firmness and melt characteristics of conventional cheese, or as desired, while improving the amount of oiling-off (fat separation) without restricting melt. The present embodiments can include the incorporation of supplemental phospholipids from milk and/or soy sources, and the like, in specific cheese to phospholipid ratios and in combination with homogenization within a specific pressure range after cooking/pasteurization. Further, the present embodiments do not require the use of emulsifying salts, though they are not prohibited either. For example, an emulsifying salt in an amount less than typically found in a processed cheese product can be useful for creating cheese products that improve melt when cooked. For example, emulsifier can be used in the range of about 0 to 0.5 percent weight for additional reduced melt restriction.

In general, in some embodiments, a cooked cheese product composition can have a raw natural cheese blend of 20 to 92 percent weight; and phospholipid supplements in the range of 0.1 to 1 percent by weight. A preferred raw natural cheese blend can be in the range of about of 70 to 90 percent weight, and a most preferred range of about 75 to 85 percent weight. The remaining functional components can accordingly be in the range of about 8 to 80 percent weight of the cooked cheese product composition and can be added to improve texture, flavor, nutrition, and/or cost attributes. One functional component is a protein supplement, which can include whey derived ingredients (e.g., whey protein concentrate), non-fat dry milk, milk protein concentrate (including Ca reduced milk protein concentrate), and the like and combinations thereof. Optional components can include various compositions of fats (such as anhydrous milk fat), moistures, hydrocolloids (such as gums and gelatin), coloring, salts, nutrients, starches and other types of food additives. Accordingly, the ratio of the cooked cheese product to phospholipids can be in the range of about 1000:1 to 100:1. Homogenization can occur right after cooking or pasteurization of the cooked and blended cheese composition. Homogenization pressures described below can vary depending on the desired amount of oiling-off. The higher the amount of pressure, the lower the amount of oiling-off. Homogenization pressures can preferably be within the range of from about 800 PSI to about 3500 PSI.

Preferably, the phospholipid supplement can be in the range of about 0.25 to 1 percent weight, and most preferably about 0.4 percent weight of a cooked cheese product and phospholipid composition. This represents a preferred cooked cheese product:phospholipid ratio range of about 99-400:1; and a most preferred ratio of about 230-260:1. The phospholipid supplement can be selected from a variety of sources such as milk phospholipids, soy phospholipids, deoiled milk lecithin, deoiled soy lecithin, buttermilk powders, egg phospholipids, and various combinations thereof. Preferably, soy and milk phospholipids can be used in a pure form (e.g., deoiled lecithin) in combination with other components such as supplemental fat, protein and/or lactose. A specific example can be high phospholipid buttermilk powders or other commercial ingredients containing enough phospholipids to obtain the supplemental ratio mentioned above. Milk phospholipids typically need a carrier. Thus, for some embodiments the phospholipid is supplied as a solid powder of a milk protein supplement with phospholipids.

A preferred raw natural cheese blend of the present embodiments can be in a range of at least one of young— medium aged cheddar and aged cheddar, in which about 0 to 70 percent weight of young or medium aged cheddar and about 0 to 70 percent weight of aged cheddar can be in the raw natural cheese blend. Ages of cheese types can vary but for illustrative purposes, young (mild) cheddar can by aged less than 6 months, medium aged cheddar can be aged about 6-12 months, and 'aged' (sharp) cheddar cheese can be aged for more than 12 months. This raw natural cheese blend can more preferably be a range of about 30-34 percent weight of young to medium aged cheddar and about 47-51 percent weight of aged cheddar. It is noted though that other types of raw natural cheese blends are within the scope of the present embodiments, such as combinations of young, medium and aged cheeses (e.g., cheddar) as well as, Swiss, Monterrey Jack, provolone, mozzarella, and the like.

Other components of the cooked cheese product composition can optionally include NaCl in the range of about 1 to 3 total percent weight, and preferably in the range of about 1.8-1.98 percent weight. As desired, water can be added to provide a total cooked product moisture in the range of about 35 to 60 total percent weight and is preferably about 43-49 percent weight. The total fat component of the cooked cheese product composition can be in the range of about 0.25 to 35 total percent weight, and preferably in the range of about 20 to 29 total percent weight. The total protein component of the cooked cheese product composition, which includes the protein supplement, can be in the range of about 10 to 30 total percent weight, and preferably in the range of about 16 to 17.5 total percent weight. Again, it is noted that the present embodiments do not require the use of emulsifying salts.

Many formulations of cheese products are possible within the scope of the present embodiments. Table 1 presents select component ranges and two exemplary formulations of such embodiments of a cooked cheese product composition. As shown, in some embodiments, the protein supplement is a MPC (milk protein concentrate) added to the raw natural cheese blend in the range of about 0.25 to 30 percent weight (preferably about 5 to 8 percent MPC). This represents a preferred cheese/phospholipid:MPC ratio in the range of about 400:1 to about 4:1; and a most preferred ratio of about 11-15:1. The MPC can be a Calcium (Ca) reduced MPC. The reduced Ca can effect oiling off and melt characteristics, but is not required to practice the current embodiments described herein (See also generally, US Pub. 2009/0092730 to Smith et al.). Supplemental fat, such as anhydrous milk fat (AMF) or cream, can be added to bring the total fat content of the cooked cheese product to about 0.25-35 percent weight and preferably to about 20 to 29 percent weight. Other components, such as described above can also can be added as a part of a solid dairy mix (SDM) or "fresh slurry".

TABLE

Illustrative Formulations (no emulsifying salts)

| | Range (% wt) | Formulation 1 (% wt) | Formulation 2 (% wt) |
|---|---|---|---|
| Cooked cheese product composition | | | |
| Raw cheese blend | 20-92 | 81 | 81 |
| Young/medium aged cheddar | 0-70 | 32 | 32 |
| Aged cheddar | 0-70 | 49 | 49 |
| Phospholipids | 0.1-1.0 | 0.25 | 0.5 |
| Protein Supplement | 0.25-30 | 7 | 7 |
| Optional (e.g. Gums, nutrients, fat) | 0.25-30 | 11.75 | 11.5 |
| Cooked cheese product parameters | | | |
| Salt (NaCl) | 0-3 | 1.8 | 1.98 |
| Sorbic Acid | 0.1-.2 | 0.1 | 0.1 |

TABLE-continued

Illustrative Formulations (no emulsifying salts)

| | Range (% wt) | Formulation 1 (% wt) | Formulation 2 (% wt) |
|---|---|---|---|
| Moisture/Water content | 35-60 | 46 | 40-46 |
| Fat | 0.25-35 | 29 | 20 |
| Protein | 10-30 | 17.5 | 16 |
| Other | 0-45.25 | 5.6 | 16-22 |

It is noted that many variations in blending steps and formulations of the present cheese product are also possible. In general, one method to produce a cooked and homogenized cheese product of the present embodiments can include, preferably in the following order, providing an uncooked blend containing a raw natural cheese blend of 20 to 92 percent weight; a protein supplement, and a phospholipids supplement in the range of 0.1 to 1 percent; cooking/pasteurizing the uncooked intermediate blend at a temperature in the range of about 145 to 250 degrees F. (about 63 to 121 degrees C.) for a period of about 1 second to 30 minutes (preferably at a temperature of about 155 to 162 degrees F. (about 68 to 72 degrees C.) for a period of about 2 minutes); and homogenizing at pressure in the range of about 800 to 3,500 PSI (about 56 to 246 Kg/cm). Preferably, pressure is applied in the range of about 1,000 to 3,000 PSI (about 70 to 211 Kg/cm).

Figure 1:
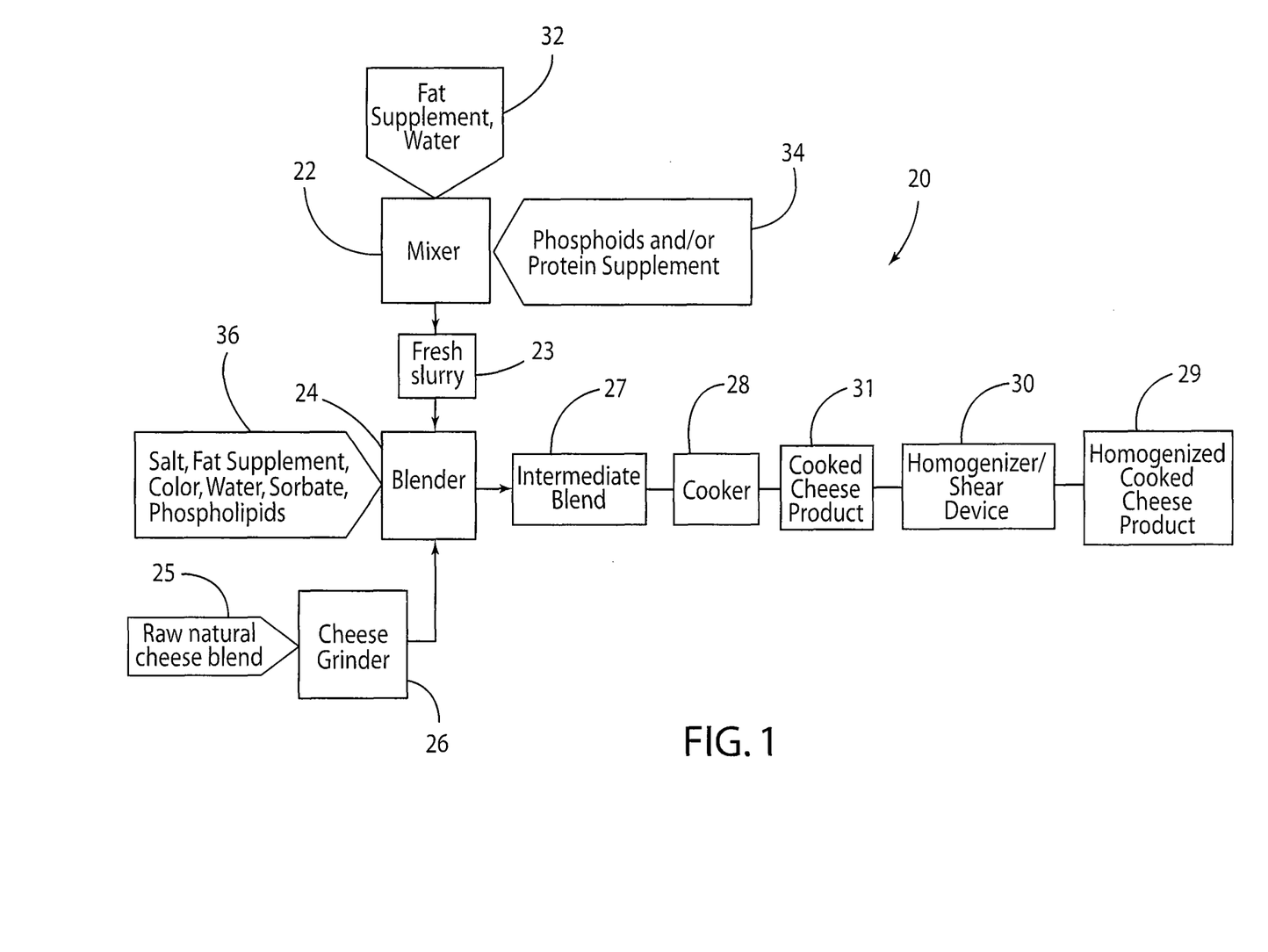
FIG. 1 is a process flow diagram to produce a phospholipids enriched cooked and homogenized cheese product of the present embodiments.
Figure 2:
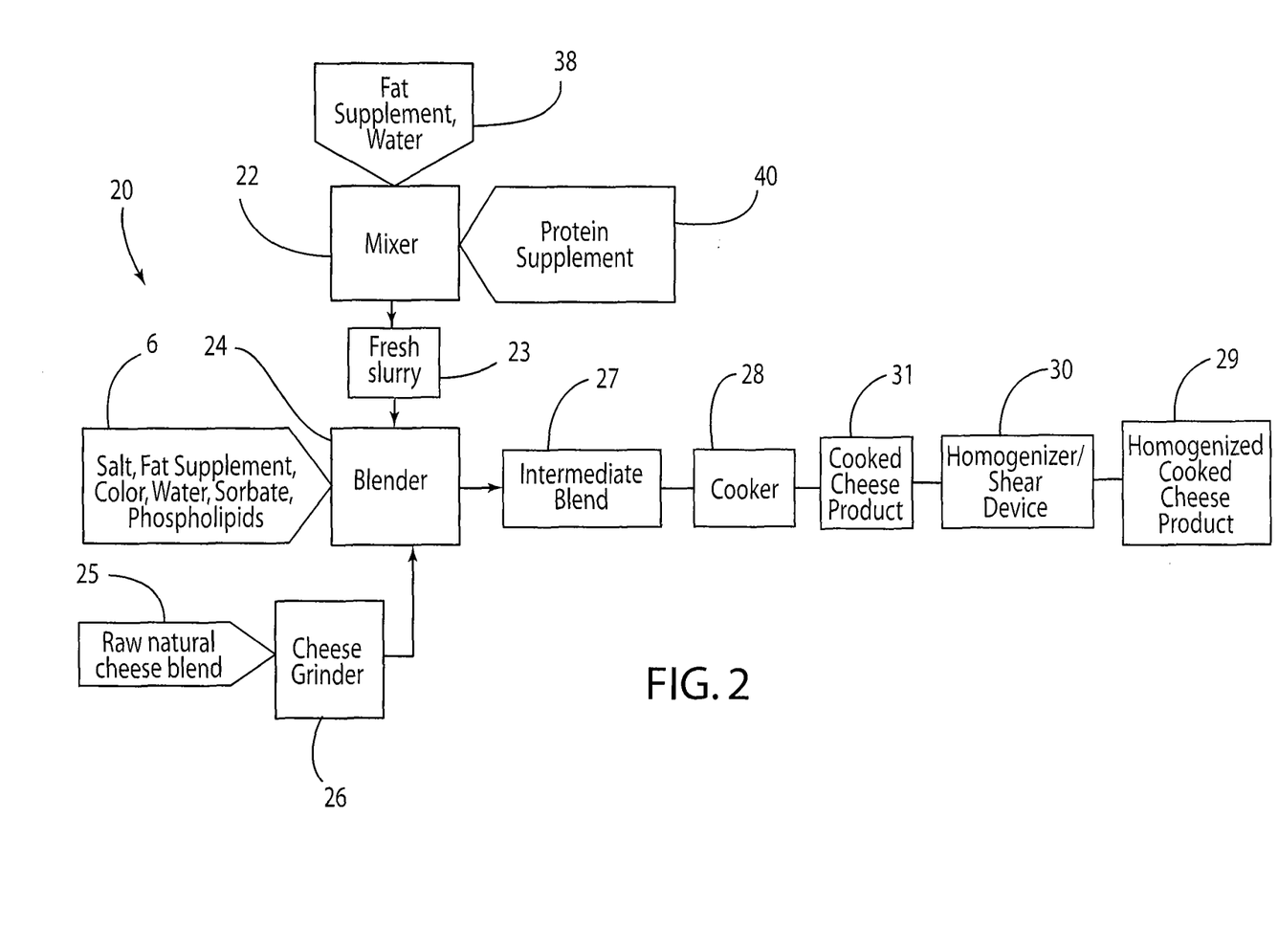
FIG. 2 is an alternate process flow diagram to produce a phospholipids enriched cooked and homogenized cheese product of the present embodiments.
Figure 3:
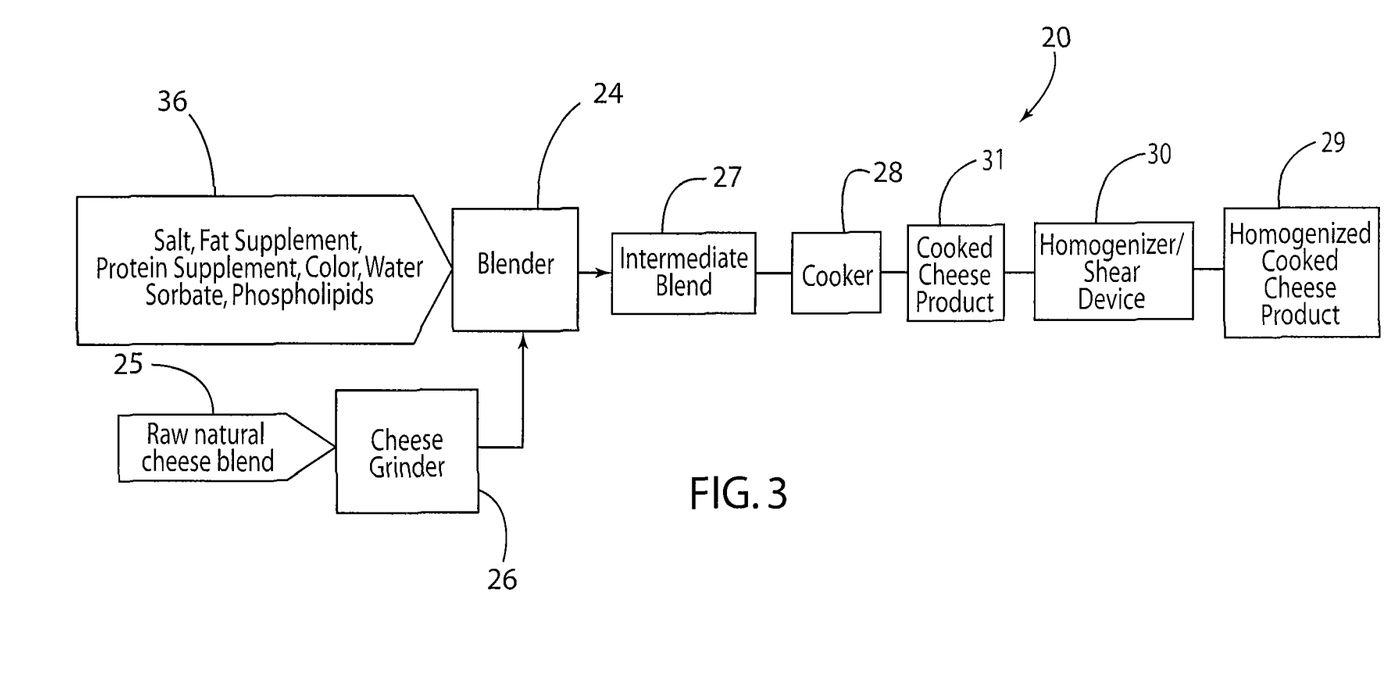
FIG. 3 is a second alternate process flow diagram to produce a phospholipids enriched cooked and homogenized cheese product of the present embodiments.

Specifically, turning to FIGS. 1-3, are shown three exemplary process flow diagrams to produce a phospholipids enriched cooked and homogenized cheese product 29 of the present embodiments and are generally shown at 20. In these processes, a raw natural cheese blend 25 of about 20 to 81 percent weight raw cheese can go through a cheese grinder at 26, then transferred to a blender 24 (such as a ribbon blender). Generally, in FIG. 1, the fat supplement and phospholipids can be added to both the blender 24 and the protein supplement added to the mixer 22. In FIG. 2, the phospholipids can be added to the blender 24. In FIG. 3, there is no mixing step and all components are fed into the blender 24. It is noted that many other types of processes can be utilize to practice the present embodiments.

As shown in FIG. 1, after/during the delivery of the raw natural cheese blend to the blender, additional components can be added to blender 24, such as the protein supplement and blended at 45 Hz for a total of about 20 minutes to produce an uncooked intermediate blend. To demonstrate the effect of adding phospholipids to the uncooked intermediate blend and resulting cooked and homogenized cheese product, three Exemplary blends A, B and C are provided. Exemplary blend A can be a 'control sample' (no phospholipids), and can be produced mixing, as shown in FIG. 1, a protein supplement such as Calcium reduced protein (e.g., Ca reduced MPC) at 34 to be at about 5-8 percent cooked cheese product composition weight with a melted AMF (anhydrous milk fat) 32 in mixer 22 then transferred as a fresh slurry 23 to blender 24 to blend these components for about 10 minutes prior to adding raw natural cheese blend 25. Exemplary blend B can add in a vegetable based phospholipid source (such as a soy based lecithin) at 36 before blending with raw natural cheese blend 25. Exemplary blend C can add in animal based phospholipids such as buttermilk enriched phospholipids at 34 to the fresh slurry 23.

Next, at 24, the uncooked intermediate blend 27 can be added with half of the desired total water content or half of the fresh slurry, salt, and sorbic acid (color optional) and blended for 10 minutes.

The uncooked intermediate blend 27 is next transferred to a cooker 28, where it can be optionally pasteurized at, for example, about 155 degrees F. (about 68 degrees C.) for about 2 minutes. The uncooked intermediate blend 27 can be sent to a cooker, such as a direct steam laydown (batch) cooker 28. It is noted though that other types of cooking processes may be used. Next, in cooker 28, the blend can be heated to 130-138 degrees F. (about 55-59 degrees C.) for about 80 to 100 seconds and blended at 155-165 RPM's. Next, the remaining water or fresh slurry, if any, can be added and mixed for 60 seconds. Following that, the blend can be cooked to 155 degrees F. (about 68 degrees C.) and held at that temperature for about 2 minutes.

Next a cooked cheese product 31 can be discharged and pumped to a homogenizer (at a range of about 1000 PSI-3500 PSI (about 70 Kg/cm-246 Kg/cm) pump pressure) 30. Once, homogenized at step 40, the homogenized and cooked cheese product 29 can be cooled, retrieved and packed.

FIG. 2 illustrates an alternate procedure to produce a phospholipids enriched cooked and homogenized cheese product 29 having about 20 percent to 92 percent weight raw cheese. In this process, raw natural cheese blend 25 can be blended in a ribbon blender 24 at 45 Hz for a total of 20 minutes.

Next, a fresh slurry 23 of supplemental protein and milk fat is hydrated in mixer 22 with hot water at 140 degrees F. (about 60 degrees C.). It is noted though that the water temperature can be ambient (22 degrees Celsius) to about 140 degrees Celsius. As for Sample A—the fresh slurry 23 hydrate can include a Ca reduced protein; for sample B—a Ca reduced protein; and for sample C—a Ca reduced protein and buttermilk enriched phospholipids. Half of fresh slurry 23 from mixer 22 can be transferred to blender 24 containing the raw natural cheese blend. The optional salt, sorbic acid, color or other food additives are added to blender 24 and blended for about 10 minutes resulting in the uncooked intermediate blend 27.

Next blend 27 can be cooked/pasteurized at about 155 degrees F. (about 68 degrees C.) for about 2 minutes. The uncooked intermediate blend 27 can be sent to cooker 28 and add half of the fresh slurry and mix for 60 seconds. Next, for sample A (Control)—no additional ingredients; for sample B (Control) lecithin can be added; for sample C—no additional ingredients. The specific cooking steps can include: cooking the composition to 130-138 degrees F. (about 55-59 degrees C.) for approximately 80 to 100 seconds) at 155-165 RPM's; add half of fresh slurry 23 and mix for about 50 to 70 seconds; then cooking the intermediate to about 155 degrees F. (about 68 degrees C.) and holding at that temperature for about 2 minutes.

Next a cooked cheese product 31 can be discharged and pumped to a homogenizer (at a range of about 1000 PSI-3500 PSI) (about 70 Kg/cm-246 Kg/cm) pump pressure). Once, homogenized the phospholipids enriched cooked and homogenized cheese product 29 can be cooled, retrieved and/or packed.

FIG. 3, illustrates a third alternate procedure to produce a phospholipids enriched cooked and homogenized cheese product 29 having 80 to 90 percent raw cheese. In this process, the raw natural cheese blend 25 can be delivered to cheese grinder 26 then delivered to blender 24 at 45 Hz and blended for a total of about 20 minutes. The protein supplement and phospholipids (plus any optional water, salt, sorbic acid, color, fat, and the like, and combinations thereof) and blended for about 10 minutes for form intermediate blend 27.

Next, blend 27 can be sent to cooker 28 and pasteurized, if desired, at about 155 degrees (about 68 degrees C.) F. for about 2 minutes. The blend can be cooked to 130 to 138 degrees F. (about 55-59 degrees C.) (should take about 90 seconds) at 155-165 RPM's. Next, the second half of the water can be added and mixed for 60 seconds, cooked to 155 degrees F. (about 68 degrees C.) and held for about 2 minutes at that temperature. For sample B, soy lecithin can be added at this point.

Next, the cooked blend can be discharged and pumped to homogenizer 30 (at about 1000 PSI to about 3500 PSI) (about 70 Kg/cm-246 Kg/cm) pump pressure) then be cooled, collected and packed at 40.

Cheese products 40 produced as described above were each tested to determine the effect of supplemental phospholipids on texture, melting and oiling-off of a blended cooked and homogenized cheese product. The results are illustrated in FIGS. 4-10. The studies provide evidence that the addition of phospholipids to a cheese product blend in combination a supplemental protein with subsequent homogenization can reduce oiling-off without affecting melting characteristics. The results demonstrate that homogenization forms a better cheese product emulsion, while phospholipids (such as soy or milk based) can contribute to improved product emulsification and also reduced melt restriction caused by homogenization allowing the use of high homogenization pressures. These findings also demonstrate these desirable results can be obtained without the use of emulsifying salts.

Figure 4:
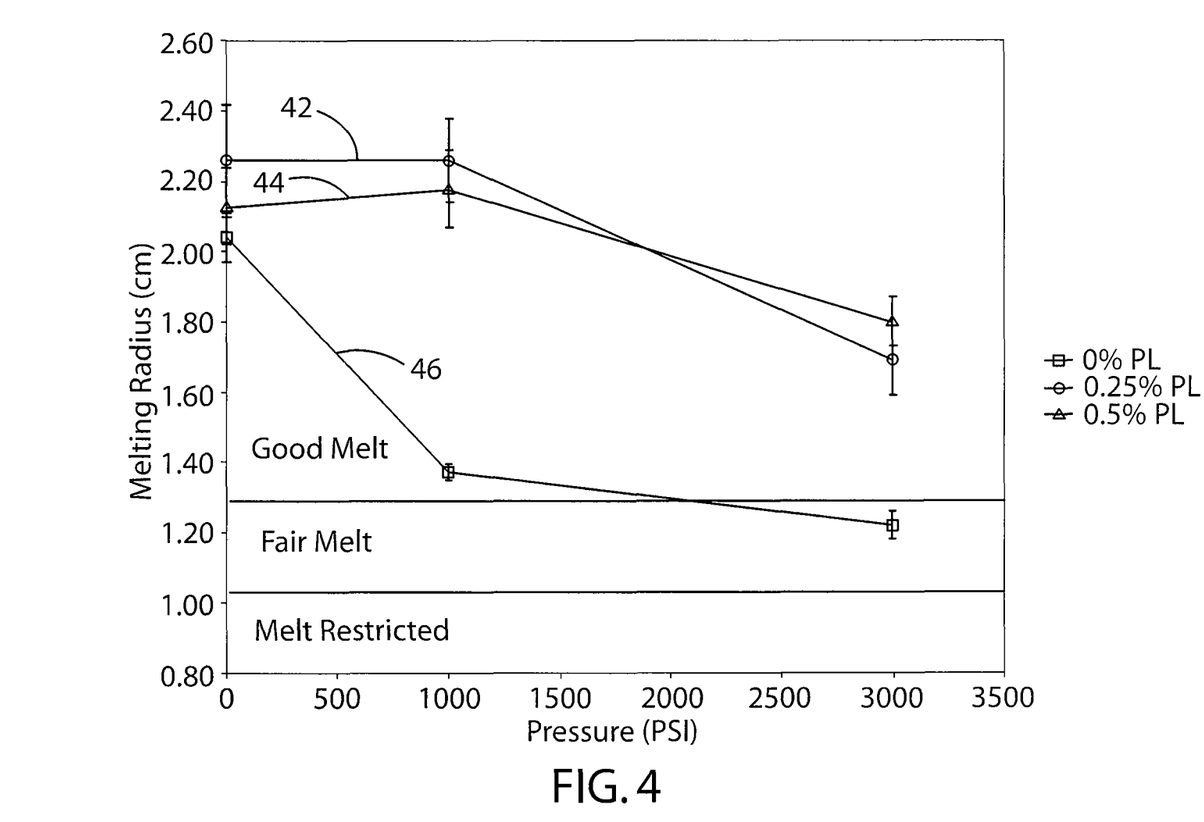
FIG. 4 illustrates a graph of the effect of soy phospholipids (PL) concentration on cheese product melt as function of homogenization pressure.
Figure 5:
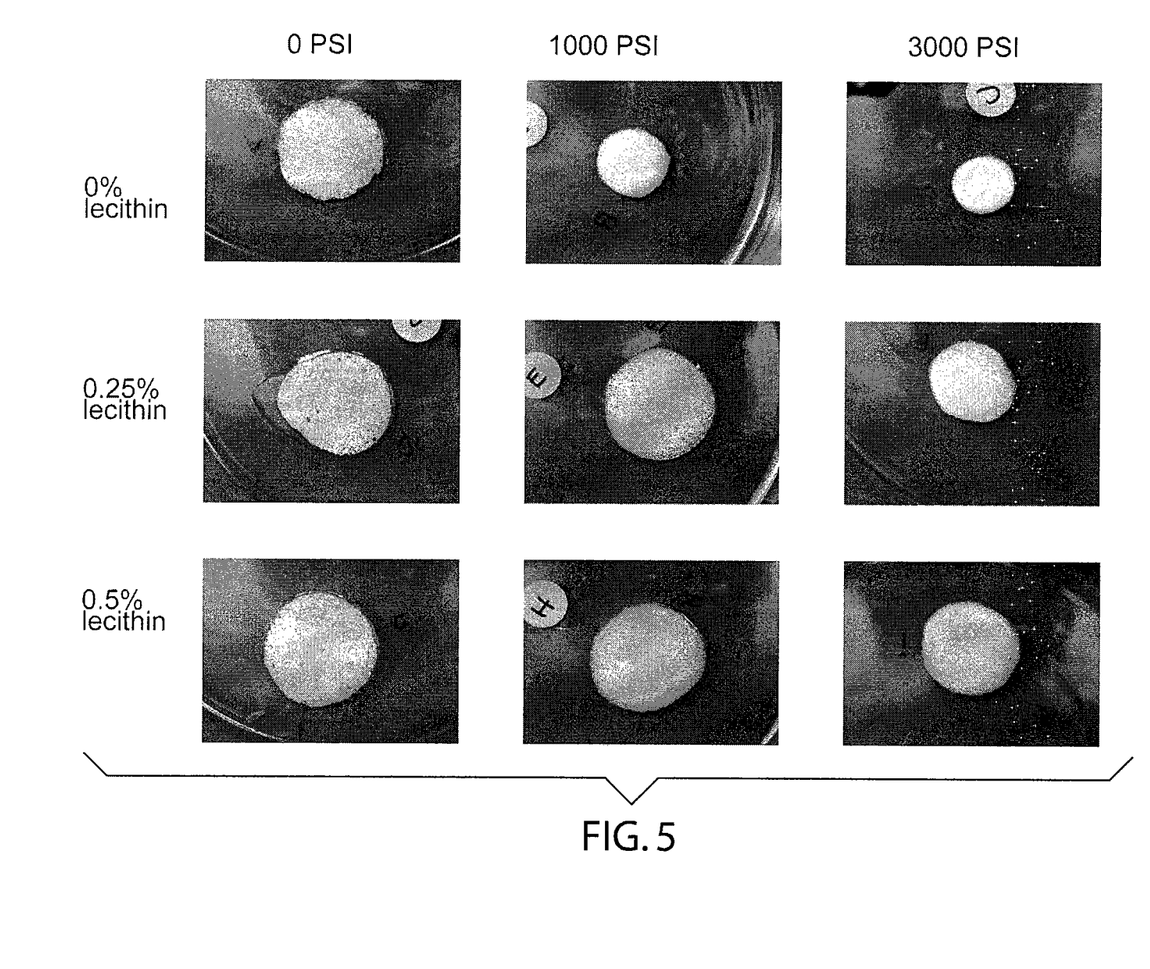
FIG. 5 illustrates oiling-off and melting observations on cheese product samples of the present embodiments based on homogenization pressure and phospholipid supplement.

Specifically, FIGS. 4 and 5 illustrate melt variations of the Table Formulation 1 as a function of the phosopholipid quantity. In this instance, the phospholipids, a deoiled soy lecithin, supplemental protein, and the raw cheese product blend were added to a cooker together with the salt (NaCl) to replace moisture. As a control, one example excluded the phospholipids component, another provided 0.25, and a third provided 0.50 percent weight phospholipids of the cheese product blend. Water was added to the cooker at 130 degrees F. (about 54 degrees C.). After cooking the three samples at about 162 degrees F. (about 72 degrees C.) for about 2 minutes, the three samples were homogenized at 0, 1000 and 3000 PSI each (about 70 Kg/cm and 211 Kg/cm). The samples were stored for seven days before evaluation. As shown in FIG. 5, the nine samples underwent comparable melt tests as described above and the degree of melt was measured as the radius of the melted pattern for each sample.

Figure 10:
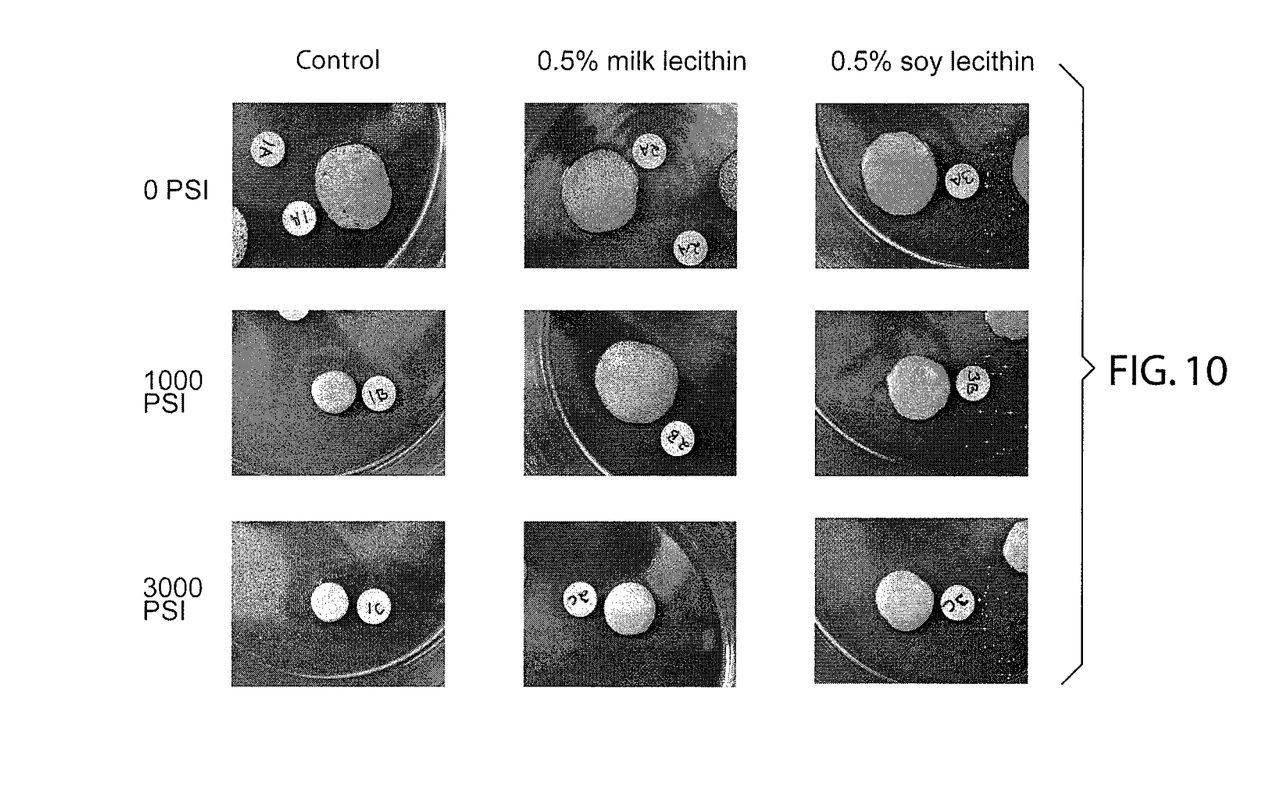
FIG. 10 illustrates oiling-off and melting observations on cheese product samples of the present embodiments based on homogenization pressure and phospholipid supplement source.

In this instance, three cooked cheese product slices thickness about 0.125 inches (about 3.2 mms) were cut with a round cutter plug of about 0.875 inches (about 22.2 mms) in diameter to obtain a total of about 3.4-3.5 gram cylinders. The present cooked cheese product and homogenized cooked cheese product cylinders were placed on a glass plate. A double boiler pot filled with about 0.75 inches (about 19 mms) water depth was brought to boil and the glass plate with cooked cheese product and homogenized cooked cheese product cylinders was placed over the boiling water for about four minutes. Presumably, the plate is about the temperature of the steam/boiling water. This method is known as disk melt and it rates molten cooked cheese product with diameters greater than about 1 inch (about 24.4 mms) as good meltability; 0.875-1 inches (about 22.2-25.4 mms) as fair meltability; and about 0.875 inches (about 22.2 mms) as poor meltability. As shown in FIG. 10, a disk was placed beside each sample to show the original product diameter.

FIG. 4 charts the melt measurements of FIG. 5 by homogenization pressures for the control (line 46), 0.25 percent phospholipids (line 42) and 0.25 percent phospholipids (line 44). FIG. 4 shows the homogenized samples without phospholipids showed a significant decrease in melting when homogenized at pressures above 1000 PSI, while samples containing phospholipids showed good melting at all pressures. As shown in FIG. 5, a decrease in oiling-off is also observed in samples having phospholipids.

Figure 6:
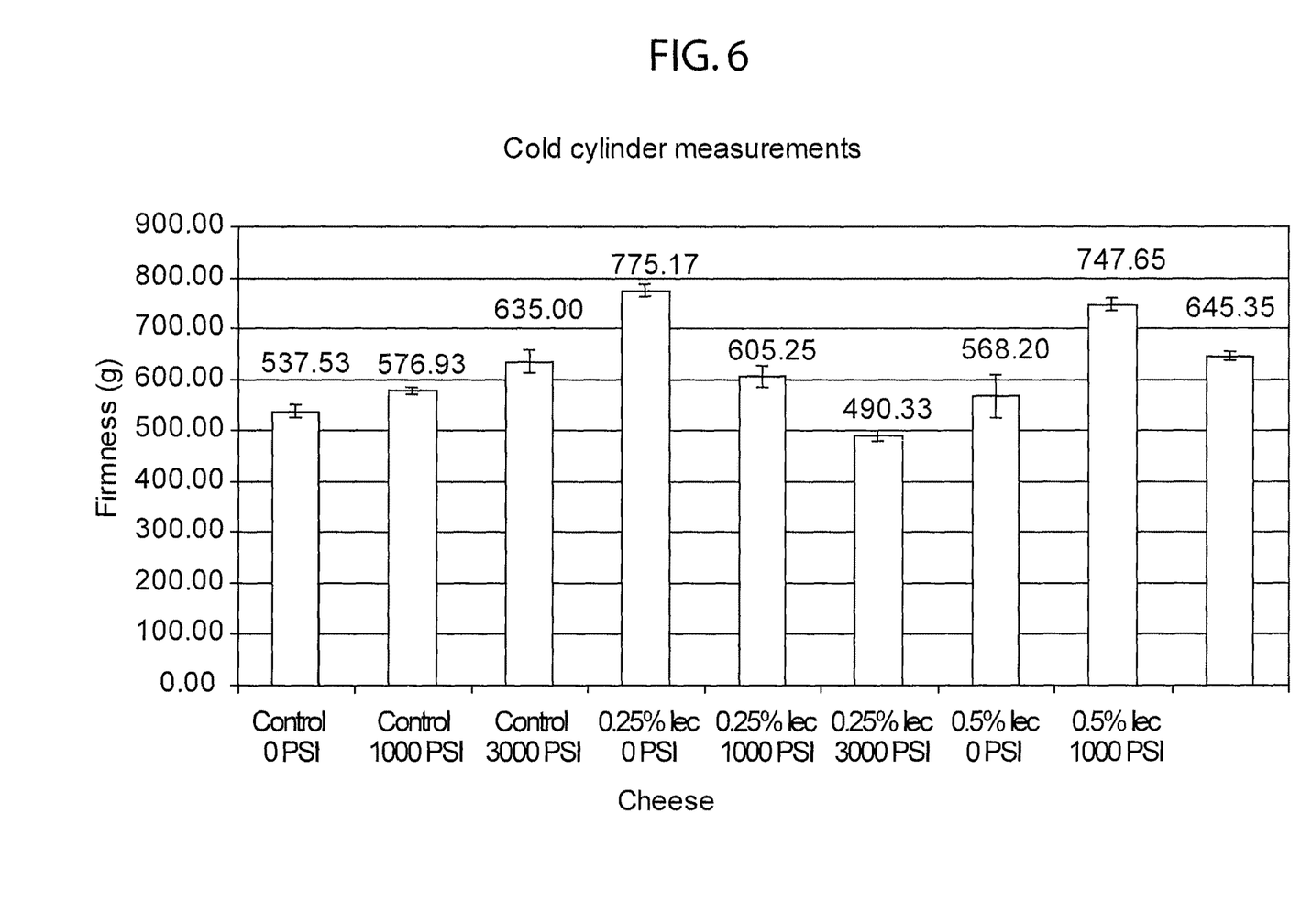
FIG. 6 illustrates firmness observations of cheese product samples of the present embodiments based on homogenization pressure and phospholipids supplement.
Figure 7:
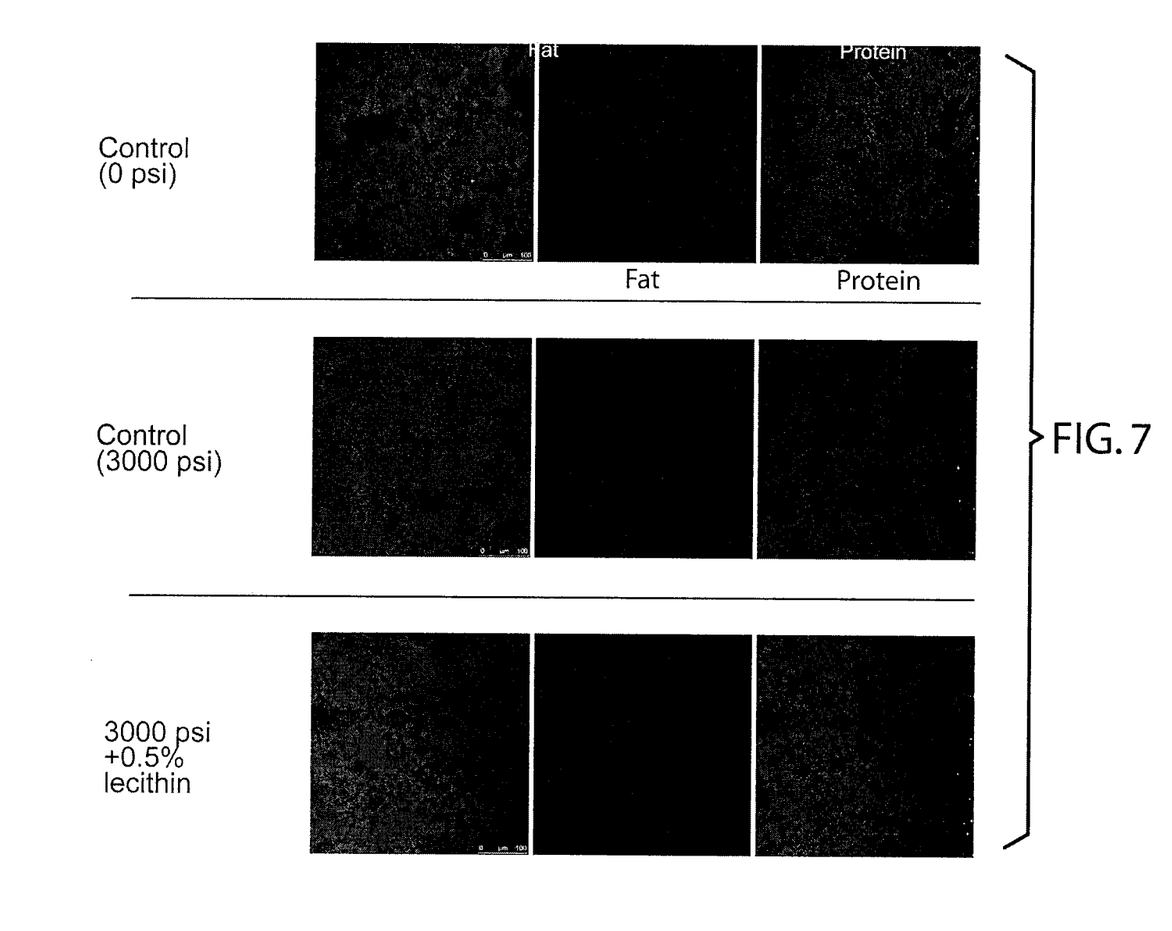
FIG. 7 illustrates observations of the microstructure of a cheese product of the present embodiments based on homogenization pressure and phospholipid supplement and separated by fat and protein components.
Figure 8:
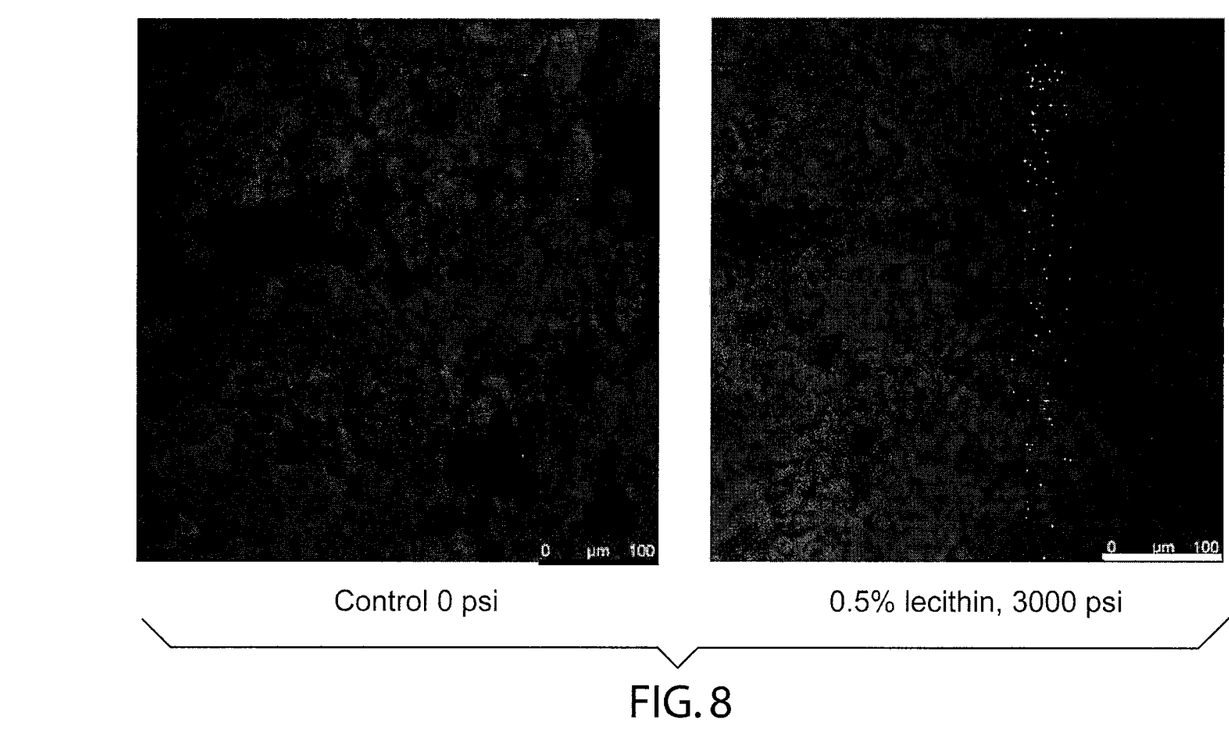
FIG. 8 illustrates close-up observations of the microstructure of a cheese product of the present embodiments based on homogenization pressure and phospholipid supplement.

Turning to FIG. 6, samples described above also showed no significant negative effects on organoleptics and product firmness. FIGS. 7 and 8 are micrographs showing no significant change in microstructure of the resultant cheese product, including when looking at fat and protein content separately.

Figure 9:
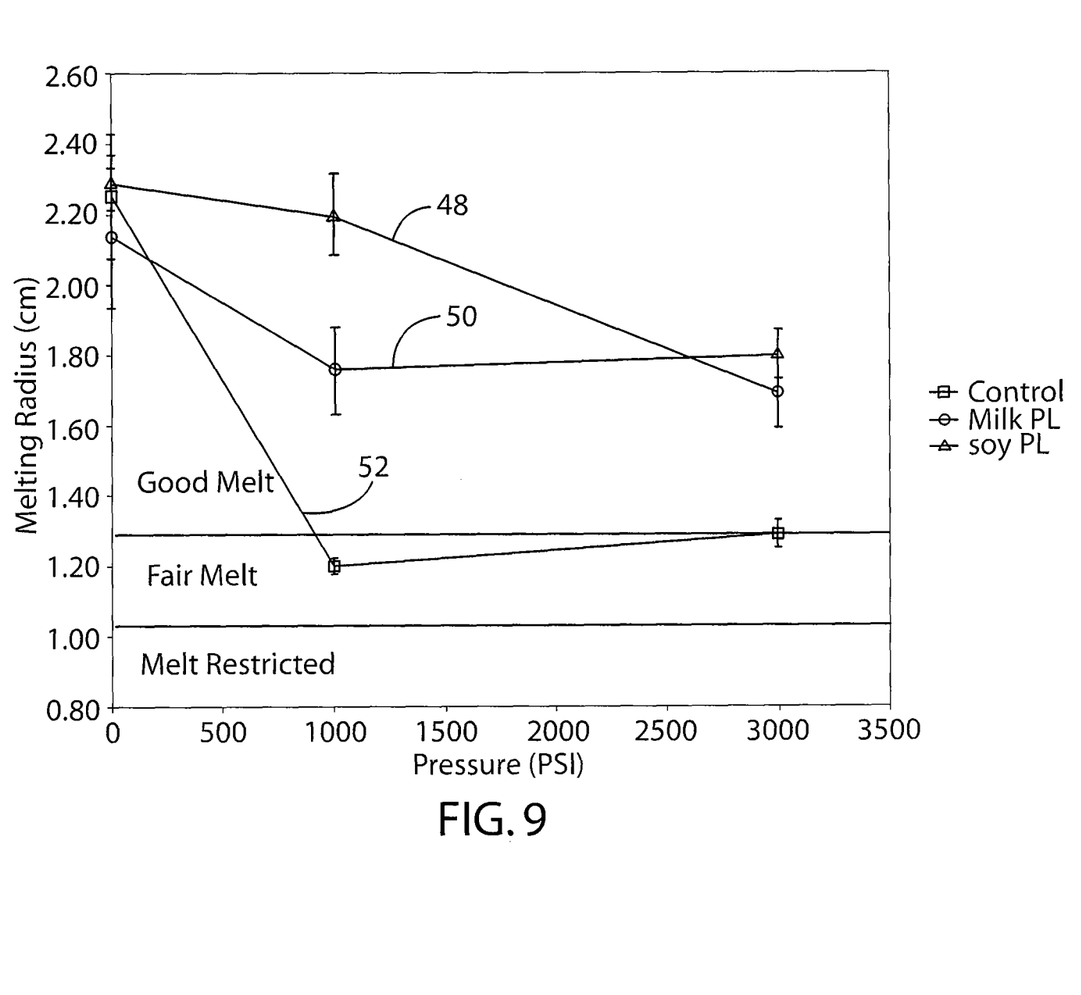
FIG. 9 illustrates a graph of the effect of a phospholipid (PL) source on cheese product melt as function of homogenization pressure of samples containing 0.5 percent phospholipids from soy and milk.

FIGS. 9 and 10 show melt characteristic variations of the Table Formulation 2 as a function of a phospholipids quality, namely, milk versus soy phospholipids. In this instance, the phospholipids, the supplemental protein and the raw cheese blend product were added to a cooker together with the salt (NaCl) to replace moisture. One sample had no phospholipids supplement. A second sample had a combination of milk protein concentrate (MPC) and buttermilk powder containing high concentration of phospholipids totaling 0.5 percent weight phospholipids. A third sample composition had 0.5 percent weight soy phospholipids. The samples, with the various solid dairy mix (SDM), were cooked at about 162 degrees F. (about 72 degrees C.) for about 2 minutes. The resultant cooked cheese samples were homogenized at 0, 1000 and 3000 PSI (0, 70, 211 Kg/cm). Disk melt test performed after storage for 7 days after production showed that milk phospholipids and soy phospholipids have a similar effect on meltability when cooked cheese product is homogenized.

FIG. 9 charts the melt measurements of FIG. 10 by homogenization pressures for the control having a supplement protein (milk protein concentrate), such as one sold under the trade name ALAPRO 4864 (line 52), 0.5 percent milk phospholipids (line 50) and 0.5 percent soy phospholipids (line 48). As shown, the milk phospholipids had similar functionality as soy phospholipids including reduced melt restriction on homogenized blended cheese, improved melting appearance from a decrease in oiling-off and reduced oil pockets when combined with homogenization. Additionally, product flavor was not affected and the addition of phospholipids help to facilitate the blended cheese product process by reducing hot viscosity.

While the products and methods have been described in conjunction with specific embodiments, it is evident that many alternatives, modifications, and variations will be apparent to those skilled in the art in light of the foregoing description.

We claim:

1. A method to produce a cooked cheese product, comprising, in order:
blending at least one raw natural cheese and a fresh slurry comprising a phospholipid supplement and a protein supplement;
cooking the blend at a temperature in the range of about 63 to 121 degrees C. for a period up to about 30 minutes to produce a cooked cheese product;
pasteurizing the blend;
homogenizing the cooked cheese product by a single stage pressure in the range of about 70 to 246 Kg/cm² right after pasteurization of the cooked and blended cheese composition;
wherein the cooked and homogenized cheese product is about 20 to 92 percent weight of at least one natural cheese, about 0.25 to 30 percent weight protein supplement, and about 0.1 to 1 percent phospholipid and wherein the cooked and homogenized cheese product contains emulsifying salts in an amount of 0 to 0.5 percent weight;
wherein the cooked cheese product does not comprise any further emulsifier, and
wherein the supplemental phospholipid source is selected from the group consisting of: buttermilk powders, egg phospholipids, and combinations thereof.

2. The method to produce a cooked cheese of claim 1, wherein the phospholipid supplement is about 0.4 percent weight.

3. The method to produce a cooked cheese of claim 1, wherein the step of cooking the blend is at a temperature in the range of about 68 to 72 degrees C. for a period of about 2 minutes.

4. The method of claim 1, wherein the cooked cheese product has NaCl in the range of about 1.8 to 1.98 percent weight; moisture in the range of about 40 to 50 percent weight; fat in the range of about 10 to 35 percent weight; and total protein in the range of about 10 to 30 percent weight product.

5. The method of claim 1, wherein the cooked cheese product has total moisture content in a range of about 35 to 60 percent weight.

6. The method to produce a cooked cheese of claim 1, wherein the step of cooking the blend at a temperature in the range of about 63 to 121 degrees C. is for a period in a range of 15 to 30 minutes.

7. The method to produce a cooked cheese of claim 1, wherein the step of homogenizing the cooked cheese product is by a pressure in the range of about 180 to 246 Kg/cm².

8. The method of claim 1, further comprising the step of blending the protein supplement at 45 Hz for a total of about 20 minutes to produce an uncooked intermediate blend.

9. The method of claim 1, wherein the cooked cheese product further comprises a supplemental anhydrous milk fat to bring the total fat content of the cooked cheese product to 0.25-35 percent weight.

10. The method of claim 1, wherein the emulsifying salts are in an amount of 0 percent weight.

11. A method to produce a cooked cheese product, comprising, in order:
blending at least one raw natural cheese and a fresh slurry comprising a phospholipid supplement and a protein supplement;
cooking the blend at a temperature in the range of about 63 to 121 degrees C. for a period up to about 30 minutes to produce a cooked cheese product;
pasteurizing the blend;
homogenizing the cooked cheese product by a single stage pressure in the range of about 70 to 246 Kg/cm2 right after pasteurization of the cooked and blended cheese composition;
wherein the cooked and homogenized cheese product is about 20 to 92 percent weight of at least one natural cheese, about 0.25 to 30 percent weight protein supplement, and about 0.1 to 1 percent phospholipid and wherein the cooked and homogenized cheese product contains emulsifying salts in an amount of 0 to 0.5 percent weight;
wherein the cooked cheese product does not comprise any further emulsifier; and wherein the supplemental phospholipid source is egg phospholipids.

* * * * *